United States Patent [19]

Newell et al.

[11] Patent Number: 4,983,496
[45] Date of Patent: Jan. 8, 1991

[54] METHOD FOR WRITING POSITION-INDICATING MARKERS ON MAGNETIC TAPE

[75] Inventors: Chester W. Newell, San Jose; Arthur D. Bates, Menlo Park, both of Calif.

[73] Assignee: Newell Research Corporation, Campbell, Calif.

[21] Appl. No.: 356,998

[22] Filed: May 25, 1989

Related U.S. Application Data

[62] Division of Ser. No. 202,482, Jun. 2, 1988, Pat. No. 4,848,698.

[51] Int. Cl.$^5$ .................. G03C 1/494; G01D 15/16
[52] U.S. Cl. .................................. 430/270; 430/945; 346/76 L; 346/135.1
[58] Field of Search .............. 430/270, 945; 346/76 L, 346/135.1

[56] References Cited

U.S. PATENT DOCUMENTS

| | | | |
|---|---|---|---|
| 3,706,844 | 12/1972 | Besier et al. | 178/7.2 |
| 3,861,619 | 1/1975 | Wolff | 242/188 |
| 4,097,895 | 6/1978 | Spong | 346/135.1 X |
| 4,216,501 | 8/1980 | Bell | 346/135.1 X |
| 4,278,756 | 7/1981 | Bouldin et al. | 346/135.1 X |
| 4,380,032 | 4/1983 | Pfost | 360/74.6 |
| 4,616,237 | 10/1986 | Pettigrew | 430/945 X |
| 4,622,284 | 11/1986 | West et al. | 430/321 X |
| 4,636,804 | 1/1987 | Kuder | 430/945 X |
| 4,884,260 | 11/1989 | Bouldin et al. | 346/135.1 X |

*Primary Examiner*—Stuart S. Levy
*Assistant Examiner*—Steven M. duBois
*Attorney, Agent, or Firm*—Thomas Schneck

[57] ABSTRACT

A method of making and of reading markers at control positions on a length of magnetic tape having light-impeding coatings on opposed sides of a transparent tape substrate. Markers are recorded by directing focused beams to control positions along longitudinal areas of the magnetic tape. The beams have an energy sufficient to ablate the coatings, but to leave the tape substrate intact. Raster scanning of the control position provides rectangular markers at prescribed positions. The longitudinal extent of these rectangular markers generally conforms to the ANSI Standard for end of tape and beginning of tape marker patterns, while the transverse extent of the markers is greter than the longitudinal extent.

13 Claims, 4 Drawing Sheets

_Fig.4_

_Fig.9_

_Fig.5_

METHOD FOR WRITING POSITION-INDICATING MARKERS ON MAGNETIC TAPE

CROSS-REFERENCE TO RELATED APPLICATIONS

This is a divisional of prior application Ser. No. 07/202,482, filed June 2, 1988, now U.S. Pat. No. 4,848,698.

TECHNICAL FIELD

The invention generally relates to control of tape webs and in particular to position indicating markers on tape.

BACKGROUND ART

In tape or film drive systems, such as magnetic tape and film recorders or playback devices, a web is often drawn from a supply roll onto a take-up roll, and vice versa, all within a single container. Frequently, in cartridge systems, a transducing head interfaces with the web through an opening in the enclosure. For purposes of this application, magnetic or other tape rolls and reels, film on reels, printing ribbons on spools and other flat, rolled webs of material are all referred to as "tape".

In tape cartridges, particularly magnetic tape cartridges, it is important that the tape web not be allowed to run off the supply or take-up rolls in the forward or reverse directions respectively. In low cost magnetic tape cartridges a strong leader and trailer is attached to the beginning of tape (BOT) and end of tape (EOT), with the other end of the leader and trailer attached mechanically to the supply and takeup rolls respectively. Upon reaching EOT or BOT the drive mechanism is stalled. In computer systems, the high torque required for rapid acceleration makes it impractical to stall the drive at EOT and BOT. Further, a load-point (LP) indication and early warning (EW) indication is required within the body of the recording web before the end of the web is reached.

There have been a number of methods employed in the prior art for the introduction and the optical reading of indicia at EOT, BOT, LP and EW control positions on a magnetic tape. The precise position of such indicia has been specified for certain size cartridges by the American National Standards Institute, for example in ANSI X3B1/625. As described in U.S. Pat. No. 3,861,619 to Wolff, methods of making tape having control position indicia include bonding or splicing strips, conductive strips, or transparent leaders to the tape. However, Wolff teaches that these methods suffer from a number of defects. First, thickness is added to the tape in the area of attachment and the added thickness may produce unreliable recording. Second, the area of attachment to the tape collects and carries debris to a read/write head and, therefore, can cause dropouts. Third, the area of attachment is subject to tension and may wear out. Finally, Wolff teaches that the reflective strips, conductive strips, and transparent leaders do not provide unambiguous indication of tape position.

Consequently, Wolff teaches punching holes through the tape at control positions to indicate EOT, BOT, EW and LP. The Wolff method does not require areas of attachment between magnetic tape and strips or leaders. However, the punched holes of Wolff do not eliminate the risk of debris contaminating the tape or the read/write head of a tape drive. Nor is unreliable recording entirely eliminated in subsequent layers near to the hole, especially at high bit densities on thin tape wound under high compression wherein embossment is caused in subsequent layers, causing head-to-tape separation and loss of data. Moreover, the holes weaken the tape. Consequently the size of the holes must be relatively small. The size of transparent markings at the control positions of a magnetic tape is an important factor in the manufacture of the tape. The hole size must be sufficiently large to distinguish the transparent markings "signal" from light "noise" projected through pinholes in the tape. Tape pinholes are caused by coating imperfections in minute areas. These imperfections may be a partial or complete reduction in coating thickness which will be detected as noise by sensors employed for sensing of the punched holes.

The "ideal" drive-sensing system collects light only over the solid angle projected through the indicia holes, in which event the optimized signal-to-noise ratio (SNR) may be as low as the ratio of hole transmissivity to background transmissivity. ANSI specifies a maximum background transmissivity of 5 %, assuring a theoretical minimum signal-to-noise ratio of 20:1 for the optimized drive. ANSI does not standardize the drives, however, and most fall far short of the ideal, and do not attain this ratio for two reasons. In drives without noise-masking apertures over the sensors, a solid angle of up to three times that from the marker hole has been routinely observed. This increases the detected noise energy by an area factor of up to nine, reducing the theoretical signal-to-noise ratio from 20:1 to as low as 2.2:1. Further, virtually all drives employ a single light source. The marks will not be on the axis of the beam, while a worst-case noise pinhole will often occur on-axis. The signal-energy-to-worst-case-noise-energy ratio will be further degraded by the off-to-on-axis-beam-intensity ratio. For a typical ratio of 0.8, the overall signal-to-noise ratio is attenuated to 1.76:1. Thus, if only minimal ANSI standards are observed, many drives would have inadequate margins of safety.

Consequently, background transmissivities of considerably less than 5 % have been found necessary by cartridge manufacturers to provide reliability using the punched hole method of marking and sensing. A decrease in background transmissivity has been accomplished by back-coating the tape. This adds thickness, is a source of contamination, and adds cost to the tape. In cartridges such as described in U.S. Pat. No. 4,172,569, assigned to the assignee of the present invention, wherein tape tension is essentially independent of drag friction, back-coating of tape serves little use other than to attenuate light noise. An object of the present invention is to provide an adequate safety margin for detecting tape markers without requiring tape transmissivity substantially less than that standardized by ANSI.

One method of making large transparent markings on tape, without thickening or weakening the tape, is to utilize solvent or chemicals to remove the opaque coatings on the opposed sides of the transparent tape substrate. It has been discovered that while this method has advantages over the above-described prior art methods, the solvent is not suitable for low-cost, high-volume production.

Another object of the present invention, then, is to increase the signal level by increasing the size of the transparent markings on the tape while avoiding the disadvantages of leaders and holes. The optical elements utilized in the reading of control position indicia are also important to maximization of the signal-to-noise ratio. In drives with optimized sensing, increasing the area of the indices alone will not increase signal level, since the noise-masking aperture over the sensors will not subtend the increased solid angle, nor will the light noise be attenuated. Only drives without a noise-masking aperture would benefit. In the preferred embodiment of the present invention, optics are provided in the cartridge to ensure that the light from the enlarged area will be converged through any drive mask aperture, so all drives will benefit.

Figure 9:
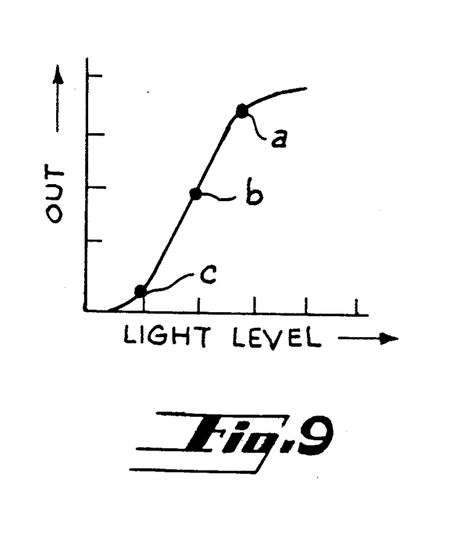
FIG. 9 is a graph of sensor output versus light level for illustrating operation of the control marker reading.

In U.S. Pat. No. 4,380,032, assigned to the assignee of the present invention, Pfost discloses an optical element having a structure such that different portions of the width of the tape can be scanned, yet light from each of these different tape portions is at least partially isolated in different tape paths with respect to other portions. The light paths in the optical element direct light from these different tape portions out of the container to a number of light sensors corresponding to the number of light paths. The sensors are connected to a feedback circuit, including a low pass filter, for discriminating between slow contrast changes characteristic of background phenomena and fast contrast changes characteristic of the color markers taught by Pfost. Maximum signal light is thus collected and sensed in the optimum region of sensitivity on the detector curve (between points a and c on FIG. 9 hereof), while light noise is suppressed to a low point of sensitivity (below point c on FIG. 9). However, although the Pfost method of marking and sensing provides for compatibility with all existing drives, only drives with the special circuitry will enjoy the improved signal-to-noise ratio. A further object of the present invention is to suppress noise to a low point of sensitivity without requiring any change in existing drives.

Optical elements may be particularly important in reading cartridges of the various tape length standards. 600 foot (183 meter) cartridges standardized by ANSI have early warning and load point markers which are circular and which have a diameter of 0.046 inches (1.17 mm). The diameter of these markers allows tape drives to distinguish the cartridges from the original 300 foot (91.5 meter) standard cartridges with markers 0.023 inch (0.58 mm) in diameter by the pulse-width of the sensor output. The present invention preserves this standard, while in one preferred embodiment shaping the noise solid angle to an oblong so that drives without noise-masking apertures will enjoy the same SNR enhancement as those employing masks.

DISCLOSURE OF THE INVENTION

The above objects have been met by a low-cost, high-volume production method of introducing markers on a tape web which increases the allowable light through a marker without a decrease in the mechanical strength of magnetic tape or an increase in its thickness. The increased light through a marker together with the noise is then attenuated, keeping signal sensing in the optimum region and suppressing noise to a low point of sensitivity without requiring any change in existing drives. The improved optics include a transparent prism having a pair of generally symmetrical input faces with an axis of symmetry which is the optical axis. Light traveling along this optical axis meets both input faces and splits the incident beam into two beams. These beams are reflected toward an egress portion having at least one refractive lens for orienting the two beams in nearly parallel directions.

The method of marking the control positions on a length of magnetic tape includes directing a laser or similar beam to a first control position. The magnetic tape comprises a transparent substrate, typically a plastic film sold under the trademark Mylar, having a magnetic coating on a first surface and optionally a dark lubricating coating on the opposite surface. The beam has an intensity which ablates the two coatings from the opposed surfaces of the tape substrate, and yet leaves the tape substrate intact. The ablation is performed in a raster scanning manner to provide a rectangular pattern of ablation. The resulting marker has an extent relative to the direction of tape travel that is in accord with the ANSI Standard for distinguishing tape cartridges having different tape lengths. The transverse extent, however, exceeds this longitudinal extent, and may be as much as one-half the tape width. The marker has an area for the passage of light greater than the markers described in the prior art by a factor of up to 3.5:1. The tape substrate remains intact, however, so that little or no mechanical strength is lost.

Two lasers or beam sources may be used in recording the markers on a length of tape or a single split-beam source of twice the power may be used. The beams may be on the same side of the tape or on opposite sides. The first beam records markers on an upper longitudinal area of the tape, while the second beam records markers on the lower longitudinal area. The beams are gated on and off to provide the various marker patterns. The markers are recorded during winding of the magnetic tape from a supply roll to a take-up roll. This makes it unnecessary to stop and start for each hole pattern, as is required for punched holes.

During play of the tape, the first-described beam splitting prism in the cartridge directs two parallel beams at the adjacent longitudinal areas which contain the markers, placing each on an axis of maximum beam intensity. The light which emerges from the tape is then converged so that the solid angle of the beam is not intercepted by any noise-masking aperture within a tape drive. That is, the optical element insures full utilization of the increase of light through a marker. The converging optics also collect noise only over the same longitudinal areas, ensuring that the SNR is essentially that of the tape and not that of the tape/drive system.

Preferably, a neutral-density filter is placed adjacent the tape and opposite the prism. The filter should have a transmissivity which is the reciprocal of the gain provided by the combination of the optical element and the rectangular markers. For example, where a net light gain of four is achieved, the attenuation filter should have a neutral density of 0.6, or 25% transmission. Light through a marker will therefore be reduced to its prior art level, while the noise light through the system will be only 25% of its prior art level. In this manner, combining all three noise suppression techniques, a signal-to-noise ratio improvement of as much as 30 db is achieved.

An advantage of the present invention is that the signal-to-noise ratio is enhanced without a corresponding loss in mechanical strength or the introduction of increased tape thickness areas. Another advantage is that the laser recording of markers facilitates low-cost, high-volume production of magnetic tape cartridges. A laser marker can scan the tape while the tape is in high-speed motion. Moreover, the improvements of the present invention are experienced whether or not a tape cartridge drive has a limiting aperture, allowing the use of non-back-coated tape.

The optical elements of the present invention may be used in existing data cartridges as a replacement for the plane mirror which is conventionally used. The construction of the present invention allows it to be mounted directly over a mirror supporting easel of existing data cartridges or may be suspended in data cartridges by means of arms affixed to the cover and to the upper portion of a prism.

BEST MODE FOR CARRYING OUT THE INVENTION

Figure 1:
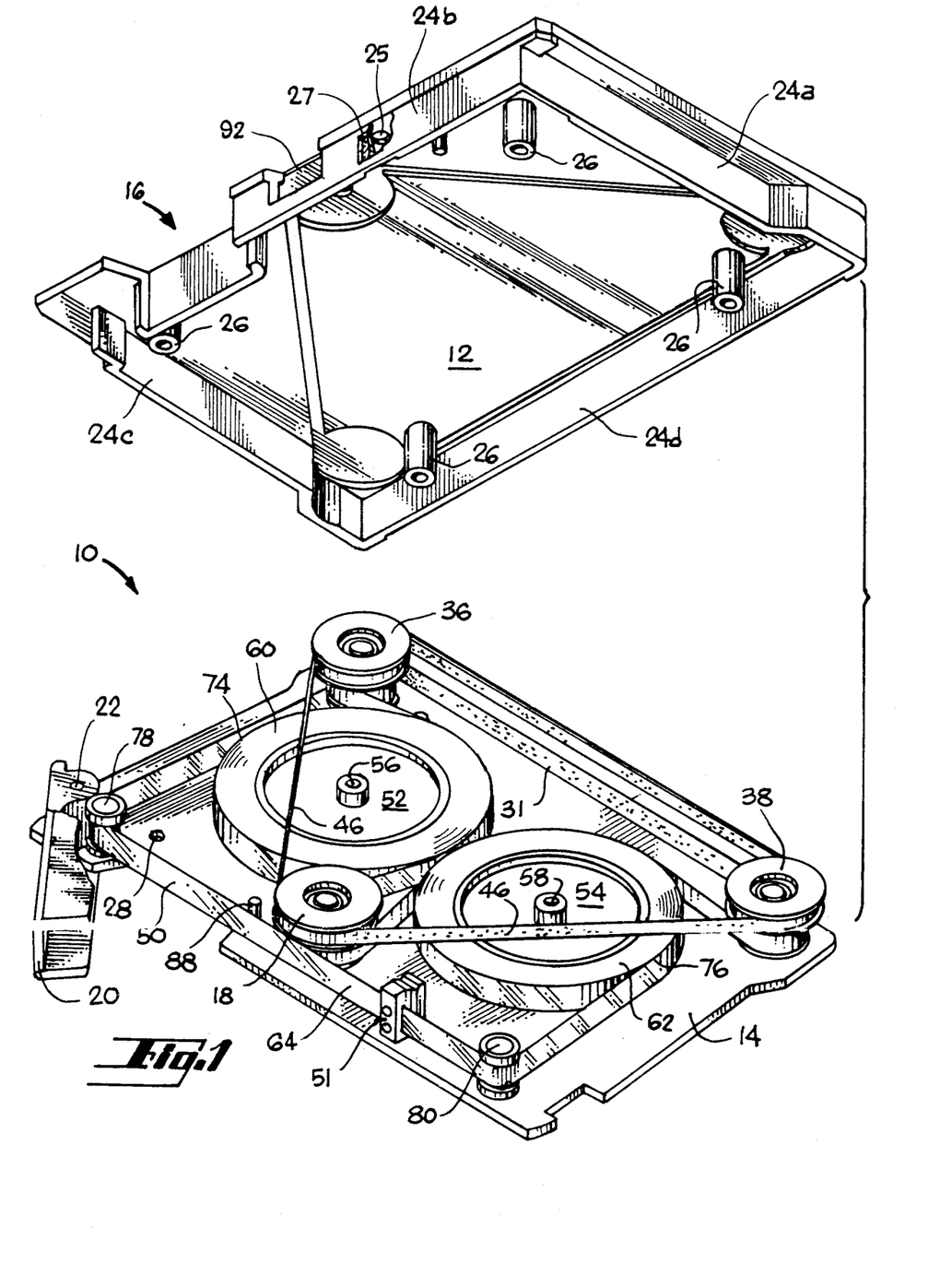
FIG. 1 is a perspective view of a tape cartridge having an optical element in accord with the present invention.

With reference to FIG. 1, a tape cartridge of the type described in U.S. Pat. No. 4,172,569, assigned to the assignee of the present invention, is shown. The purpose of this description is to illustrate the placement of optical element 51 in relation to a magnetic data cartridge.

A magnetic data cartridge 10 includes a plastic molded case upper wall 12 and a lower metal wall 14. The upper and side walls may be opaque or translucent, or a mix. Dimensionally, the cassette conforms to the previously mentioned ANSI Standard X3B1/625. This standard dictates the general overall dimensions of the cassette, including the position and size of a head aperture or port 16, the position of a rotary drive and belt guide member 18, and the size, shape and position of a tape guard 20, which is mounted for rotation about a pin 22 fixed to lower wall 14 in order to render the cartridge compatible with existing commercially available equipment. The molded plastic upper wall 12 and side walls 24a, 24b, 24c and 24d are configured to space the lower wall 14 from upper wall 12. Upper wall 12 is provided with a set of similar legs, 26, for mounting the upper wall to the lower wall 14 by means of screws, not shown, through a set of plate holes, 28. A first transparent window 25 in top wall 12 admits light from a source, while a second window 27, near the first window, allows light to egress from the cartridge toward detectors, described below.

First and second hubs 52, 54 act as interchangeable tape supply and take-up hubs and are rotatably mounted with parallel axes of rotation and in a generally coplanar relationship on the lower wall 14 by means of a pair of axial shafts 56, 58. A length of magnetic tape 50, having a nominally 0.001 inch backing thickness, or thinner, the backing is a plastic film sold under the trade name Mylar, is distributed within the cartridge 10. The tape has one end portion of roll 60 wound on the first hub 52, an opposite end portion of roll 62 would on the second hub 54, and an intermediate portion 64 extending between the hubs from a peripheral point 74 on tape roll 60 to a peripheral point 76 on tape roll 62. In operation the tape 50 passes between the rolls 60, 62 in a path parallel to the lower wall 14. The tape has a coating of magnetic material completely across the width of the tape, the width typically being 0.25 inch.

The intermediate portion 64 of the tape is trained over a pair of similar tape guides 78, 80 which are non-rotatably fixed to the wall 14. The tape guides 78, 80 provide proper alignment of the tape 50 with the aperture 16, as per ANSI Standard X3B1/625 in order to maintain a proper operational relationship with a magnetic recording head which may be part of a tape drive, not shown, approaching the tape at the magnetic head position when in operative placement with the tape drive. A tape support pin 88 fixed to the lower wall 14 prevents the tape 50 from touching the drive and belt guide member 18 while the head is in operational contact with recording tape 50. The tape 50 runs parallel to the sidewall 24b and past an optical element 51, described below with reference to FIG. 2. The optical element 51 is mounted near the transparent windows 25 and 27 of walls 12 and 24b so that light can enter the element from outside of the windows.

The drive member 18 is rotatably mounted on a shaft to the lower wall 14 at a centered frontal position on the cartridge 10 as per ANSI Standard X3B1/625 so as to protrude through an opening 92 in the upper wall 12 for engagement with a drive capstan when the cassette 10 is in operative placement in a record-playback apparatus, not shown. The pair of similar rotary belt guide members, or idlers, 36, 38 are rotatably mounted on a pair of parallel shafts fixed to the lower wall 14. The idlers 36, 38 each have a stepped construction with pulley portions of different radii for affording different mechanical advantages as described in U.S. Pat. No. 4,172,569. The idlers 36, 38 and drive member 18 are all disposed on axes parallel to the axes of the hubs 52, 54 and are vertically aligned. A tensioning belt 46 is trained about the rotary drive member 18 and idlers 36, 38.

An endless loop drive belt 31 having a fixed length is trained about the drive member 18 and the idlers 36, 38. It is emphasized that the cartridge description herein is exemplary and other types of containers could employ the features of the present invention. Whatever type of container is used, the present invention calls for placement of an optical element 51 in a position for optically communicating from the tape to optical sensors outside of the container, the tape being illuminated by a source outside of the container.

The optical element 51 has paths which extend from the tape directly in front of optical element 51 to light sensors. The paths are mutually optically isolated, at least to the extent that light from contrasting markers in different tracks on the tape can be read and associated with the proper marker.

Under the previously mentioned ANSI Standard, tape position is indicated by markers at control positions of the tape. Such markers are sensed by light detectors mounted within a tape drive or reproducing machine to receive light from the second window 27 of the data cartridge 10. Tape drives having light detectors adjacent the second window 27 are in widespread use today and the present invention contemplates tape containers which are compatible with such existing units.

Figures 2, 3, 8:
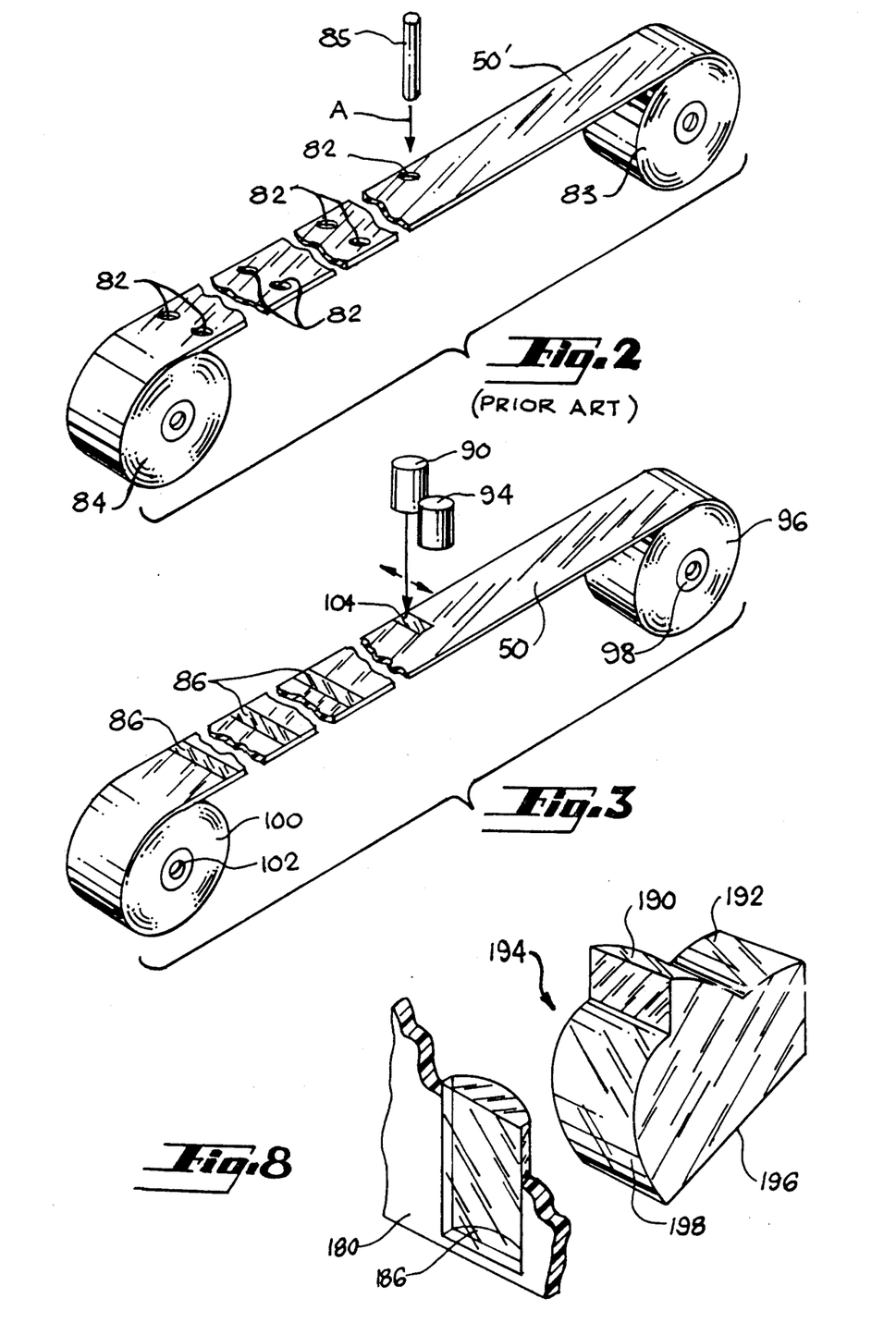
FIG. 2 is a diagrammatic view of a method for marking control positions on a magnetic tape in accord with the prior art.
FIG. 3 is a diagrammatic view of a method of marking control positions on a magnetic tape in accord with present invention for use in the tape cartridge of FIG. 1.
FIG. 8 is a perspective view of a third embodiment of an optical element in accord with the present invention.

FIG. 2 schematically illustrates a prior art method of introducing markers 82 into magnetic tape 50'. As the magnetic tape 50' travels from a supply roll 83 to a take-up roll 84, a punch 85 is moved vertically, shown by arrow A, to establish the circular holes which act as markers. Hole pairs require dual punches.

The beginning of tape (BOT) markers are sets of two holes punched in the tape. There are three sets of holes provided, the innermost of which is used for the purpose of identifying the storage position of the cartridge. In the storage position, all of the permissible recording area of a tape is wound on a supply hub and is protected by at least one layer of tape. The other two sets of holes are used to insure that BOT is detected. An end of tape (EOT) marker, on the other hand, is a single hole punched in the lower edge of the tape. Again, redundant holes are provided to insure reliability of detection. A load point marker is a single hole punched in the upper edge of the tape to indicate the beginning of the permissible recording area in a forward direction. Finally, an early warning marker is a single hole also punched in the upper edge of the tape for the purpose of indicating the approaching end of the permissible recording area in the forward direction, since recording must cease before the EOT marker is sensed.

The markers 82 are recorded on two longitudinally extending areas of the magnetic tape 50'. The early warning and load point circular markers of the original 300 foot standard cartridge are 0.023 inches in diameter, whereas the 600 foot standard cartridges have circular holes of 0.046 inches. This allows drive manufacturers to detect the difference in tape lengths and the corresponding coercivities for automatic head-current switching.

Referring now to FIG. 3, it has been discovered that laser ablation of the coatings on the opposed surfaces of a tape substrate provides the optical contrast required for more reliable detection of markers 86. This method of introducing markers has no significant effect upon the mechanical strength of the magnetic tape 50, since the tape substrate remains intact. A magnetic tape 50 comprises a transparent tape substrate, typically a plastic film sold under the trademark Mylar, having a coating of magnetic material on a first surface and may have a lubricating coating on the opposite surface. Lasers 90 and 94 are utilized to ablate the coatings. The beams from the lasers 90 and 94 have sufficient energy for ablation of the coatings, yet leave the transparent substrate intact. The lasers are independently operated to record markers on two longitudinally extending areas of the magnetic tape 50. Lasers 90 and 94 may be a single split-beam laser with gating or switching means.

In operation, the intermediate portion of the magnetic tape 50 travels between a supply roll 96 of tape on a hub 98 to a take-up roll 100 on a second hub 102. In contrast to a hole punching method which requires that tape travel be ceased prior to introduction of a marker, laser ablation of coatings may be performed during tape travel. Ablation is executed in a raster scanning of a beam focused on or near the coatings thereby forming rectangular markers. The markers 86 which may stretch across the entire width of the magnetic tape 50 are established by operation of both lasers 90 and 94. The markers 86 are typical of the redundant BOT markers. Alternatively, a single laser 90 may be operated to form a marker 104 in one longitudinal area, or track, of the magnetic tape. The marker 104 is typical of a load point or early warning marker.

The load point marker 104 has an extent parallel to the direction of tape travel which is in accord with the ANSI Standard. That is, the "longitudinal" extension of the load point marker 104 is either 0.023 inches or 0.046 inches, depending upon the length of tape in the associated tape cartridge. However, unlike the circular markers of the prior art, the transverse extent of the marker 104 exceeds the longitudinal extent. The transverse extent is preferably one-half of the width of the magnetic tape 50. Thus, in quarter inch tape the transverse extent is 0.125 inches, far exceeding the maximum transverse extent of 0.046 inches of prior art markers.

While not universally used, some tape drive manufacturers optimize light noise rejection by placing limiting apertures in the front of detectors used to read markers. In such tape drives the rectangular markers 86 and 104 may provide signal area which is intercepted by the limiting aperture. That is, the solid angle of the marker may be intercepted. In contrast, the smaller solid angle of a pinhole of light will not be intercepted. This attenuation is also a concern with the larger diameter (0.046 inch) punch holes of the prior art. For this reason, choice of the proper optical element 51 of FIG. 1 is important.

By comparing the products of the solid angles, the relative transmittances, and the brightness factors of the two systems, it has been discovered that the present invention provides in optimized drives a possible net gain of up to 3.5 with respect to the circular markers and sensing system of the prior art. In many drives which are not optimized, a net gain of 35 is possible. Consequently, it is possible to improve the signal-to-noise ratio by 10 to 30 db. Note that noise is a result of the relatively small portion of light which is transmitted through the magnetic tape 50 and, more importantly, is a result of light through pinholes in the magnetic tape of minute dimensions comparable to those of the markers. Such pinholes are imperfections in the magnetic tape 50. A net gain of 10 to 30 db provides a number of options for a manufacturer of magnetic tape cartridges. For example, if non-back-coated tape is to be used, a neutral-density filter may be placed between the magnetic tape 50 and the detectors utilized in reading the markers. By using an attenuation filter with a neutral density of 0.6, 25% transmission is allowed. Such a filter may be used where a net gain of 4 is achieved by the rectangular markers with the new optical element. The neutral density filter will attenuate the signal to a level comparable with that of the prior art, and will also attenuate the noise light to a level which is 25% of the prior art level. In this manner a signal-to-noise ratio improvement of approximately 4:1 is achieved. In all events, the neutral-density filter should have a transmissivity which is the reciprocal of the net gain.

Alternatively, the lasers 90 and 94 may provide such energy that the transparent substrate of the magnetic tape 50 undergoes change to provide scattering of the read beam of a tape drive. Thus, a rectangular marker 86 and 104 provides a diffused image at the tape plane. With the proper optical elements, this image can be further distinguished from the noise caused by pinholes in the magnetic tape by imaging the marks on the apertures at the mask plane, while imaging the direct light through the pinholes well past the mask. Noise can thereby be suppressed without use of a neutral-density filter.

A third option for the cartridge manufacturer is to continue to use back-coated tape to suppress noise, and to employ most or all of the higher signal level to improve EOT/BOT-sensing reliability. Many drives without noise-masking apertures have lowered noise susceptibility at the expense of signal sensitivity by reducing detector gain in order to accommodate the lowest signal-to-noise ratio allowed by ANSI. Consequently, such drives can miss EOT/BOT marks from some cartridges, particularly if the cartridge windows are dirty or the interior mirror is misaligned. A significant increase in light level assures that the light detectors of such drives will be driven at least into their high sensitivity region on the curve, greatly enhancing their ability to detect a mark.

Figure 4:
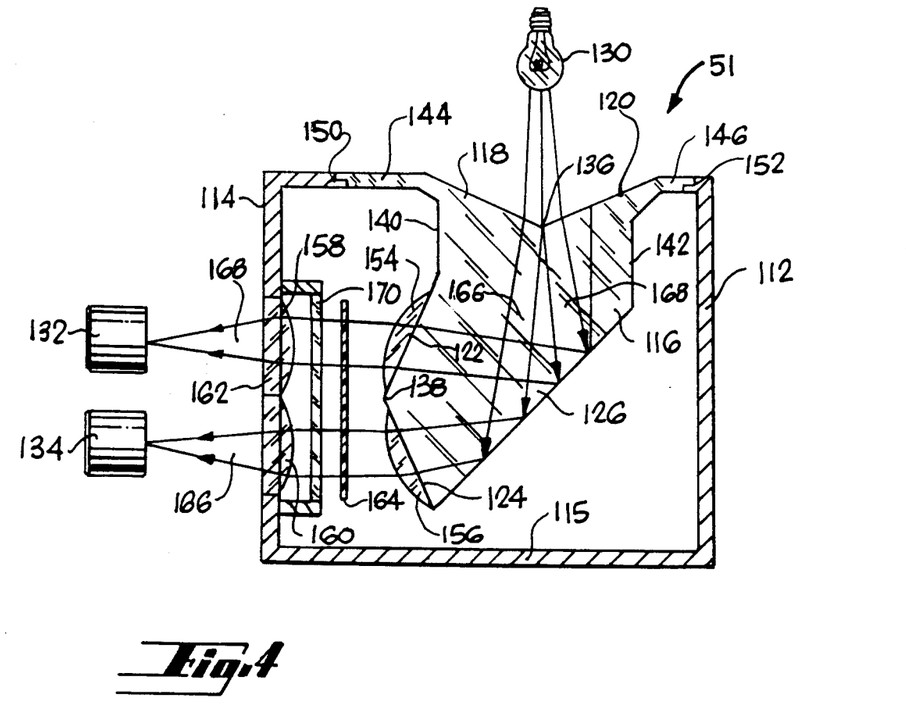
FIG. 4 is a side sectional view illustrating an optical element in accord with the present invention for use in the tape cartridge of FIG. 1.

With reference to FIG. 4, the optical element 51 of FIG. 1 is shown in schematic detail. Upright members 112 and 114 support a heptagonal prism 116 above a bottom wall 115. The prism has a pair of input faces 118 and 120 and a pair of output faces 122 and 124, each of the pair of faces forming a V-shape combination. A reflective fold surface 126 reflects light from source 130 toward detectors 132 and 134.

Prism 116 is a beam splitting prism about an optical axis defined by the center point 136 of the V-shaped input faces 118 and 120 and by the center point 138 between symetric output faces 122 and 124. Sides 140 and 142 space the input faces a distance from the output faces. At the upper limit of sides 140 and 142 are respective outwardly extending arms 144 and 146 which suspend prism 116 from upright members 112 and 114. Snap joints 150 and 152 may be provided for securing the prism in place with regard to the upright members.

Output faces 122 and 124 have refractive lens facets 154 and 156 joined to the V-shaped output sides or molded as a part thereof. The purpose of the lenses is to convert divergent beams to parallel beams for later convergence toward detectors 132 and 134. Auxiliary convex lenses 158 and 160 are connected to window 162 for causing convergence of the beam at the focal plane of detectors 132 and 134. The convex lens facets 154 and 156 are spherical in shape with a spherical radius R equal to $u*(n-1)/n$ where u is the optical distance from the lens surface to the object source and n is the index of refraction of the prism material. The lens facets 154 and 156 are shown spaced on one side of magnetic tape 164, while the convergent lenses 158 and 160 are shown on the opposite side.

In operation, light from source 130 is downwardly directed onto the V-shaped input faces 118, 120 in a manner which is generally symmetric about the center point 136. The light from source 130 is split into two beams because the angularly inclined input faces create two images of the source. These two beams 166 and 168 are each of maximum intensity and are reflected by the reflective fold plane 126. Before reaching lens facets 154 and 156 the beams are divergent. After passing through the lens facets, the beams are less divergent but not yet convergent. In this condition, a portion of the beam passes through markers in tape 164 when the markers are aligned with the beam. Upon passing through markers in the tape, the beams pass through lens elements 158 and 160 which make the beams convergent at the focal plane of detectors 132 and 134. Note that the beam splitting prism 116 allows one beam to be directly above the other in a vertical dimension. This allows two markers in tape 164, one above the other, to be read simultaneously in detectors 132 and 134, and both to be on the axes of maximum beam intensity.

Not shown in FIG. 4 is the window in the upper wall of the cartridge housing immediately below lamp 130. Lamp 130 and detectors 132 and 134 are usually part of a tape drive and not part of a cartridge. Because lens elements 158 and 160 converge the beams at the focal plane of the detectors 132 and 134, full advantage is taken of the net gain provided by the rectangular markers of FIG. 3 even where a tape drive includes a limiting aperture in front of the detectors. A neutral-density filter 170 having a transmissivity that is the reciprocal of the gain may therefore by employed to improve the signal-to-noise ratio. The filter will reduce the gain to 1 but will also attenuate the noise from pinholes and tape transmission to a percentage of the unfiltered level which maintains it below point c of FIG. 9. In this manner a signal-to-noise ratio improvement is achieved.

The upright walls 112 and 114 form a support structure for prism 116 within a data cartridge. In most cartridges of the prior art, for example as exemplified in U.S. Pat. No. 3,692,255, there is an easel upon which a mirror rests for deflection of light from a top wall window to a side wall window. That reflective surface of the prior art may correspond to the fold surface 126 of prism 116. Moreover, prism 116 may be disposed on an easel of the prior art rather than upright members 112 and 114. Once the prism is put into place, the entire support structure may be mounted on the bottom wall of a data cartridge by adhering wall 115 to the bottom wall 14 of a tape cartridge.

Figure 5:
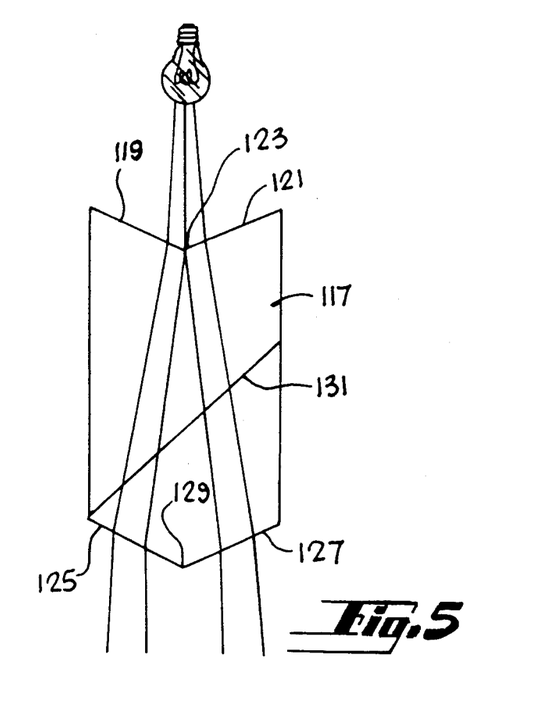
FIG. 5 is an unfolded plan view illustrating construction of the optical prism embodied in FIG. 4.

FIG. 5 shows the principles of the heptagonal prism 116. In FIG. 5, it is seen that prism 117 has input faces 119 and 121 which are symmetric about point 123 in a V-shaped manner. Output faces 125 and 127 are also V-shaped faces symmetric about point 129. If the output faces are folded about a fold plane 131 in a 90° flip, a structure similar to that shown in FIG. 4 will result. The folding discussed herein is a two dimensional conceptual fold and not an actual three dimensional fold. The folded path described herein gives rise to a right angle beam splitting prism described above. The fold plane 131 is at approximately 45° to the horizontal. Refractive lens facets are not shown in FIG. 3 since only the main body of the prism geometry is considered here.

Electronics for processing detector signals from markers in tapes, as well as a description of the tape itself, is contained in U.S. Pat. No. 4,380,032, incorporated by reference herein. The present invention provides low noise optical signals which are especially useful in reading EOT/BOT markers in high speed tape cartridges, and would provide an ideal means for providing the "hole pattern" needed for compatibility with existing drives as taught in that patent. Further, the color marks described in U.S. Pat. No. 4,380,032 could be similarly formed by choosing an oblique angle of incidence between the laser beam and the tape surface. After ablating away the backcoating, most of the beam energy would be reflected away by the "shiny" Mylar surface, thereby creating a "color mark" on the backcoating only.

Figure 6:
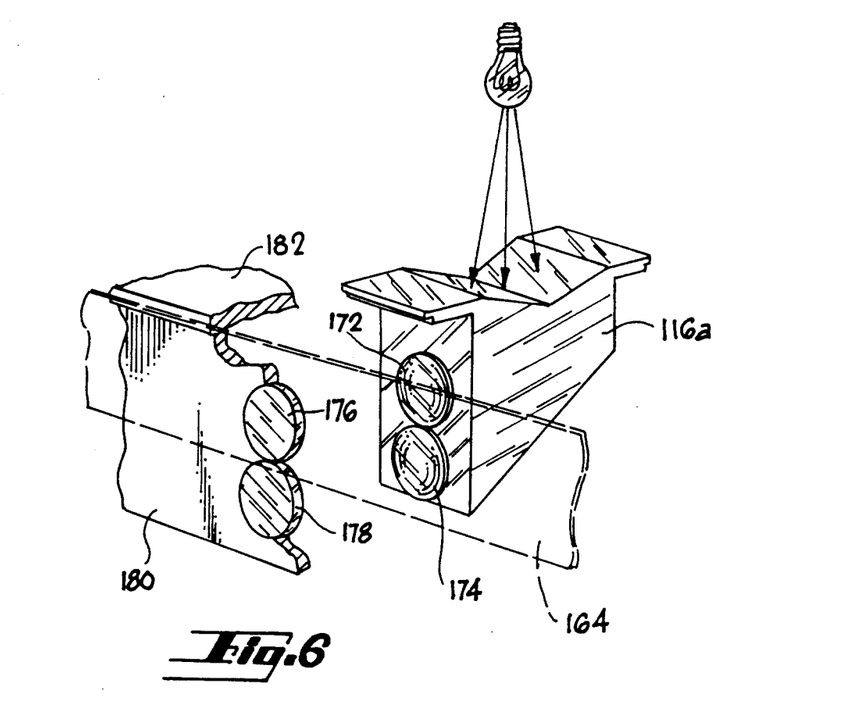
FIG. 6 is a perspective view of a first embodiment of an optical element shown in FIG. 4.

With reference to FIG. 6, optical element 116a is shown having convex spherical lenses 172 and 174 for directing light outwardly from the prism onto tape 164. As described, light passing through the tape may be focused through any noise-masking aperture onto detectors associated with a drive by means of convex lenses 176 and 178. The optical components of FIG. 6 may be separately molded and snapped into the cartridge lid 182 or mounted on the wall 14 using means obvious to those skilled in the art.

Figure 7:
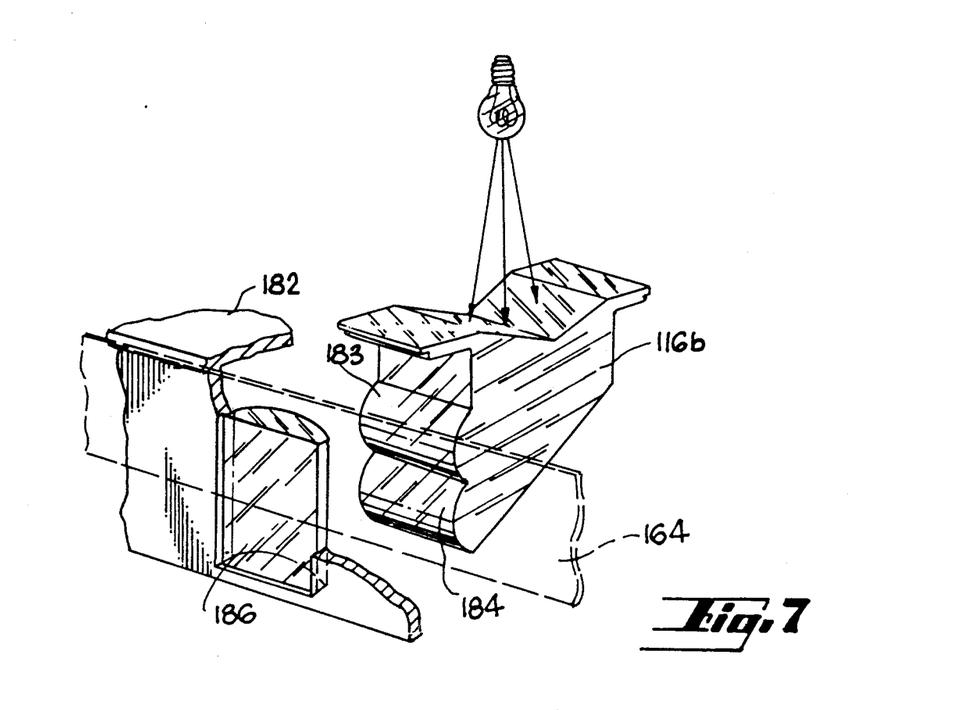
FIG. 7 is a perspective view of a second embodiment of an optical element shown in FIG. 4.

In FIG. 7, the folded prism 116b employs an upper cylindrical lens 183 and a lower cylindrical lens 184 for the purpose of directing light onto tape 164. Light passing through the tape is focused on a detector associated with a drive, not shown, in the vertical axis by cylindrical lens 164, and in the horizontal axis by cylindrical lens 186. By choosing the dimensions of the cylindrical lenses to include only the solid angles of the light which can project through the rectangular marks, embossing the walls of the prism to eliminate internal reflections and choosing the focal points of the cylindrical lenses to converge the rays on the detectors, noise masking is achieved by the cartridge even without masks in the drive. This is a general and preferred embodiment of the optical element 51.

Finally, FIG. 8 shows an embodiment which is simpler but functionally identical to the above-described optics. The curved and V-shaped input faces 190 and 192 of a prism 194 collect light from the source and split a single input beam into dual beams of maximum intensity. The dual beams are reflected at a 45° surface 196. The reflected beams are diverging beams, but are refracted to converge at the detectors in the vertical axis by a cylindrical lens 198 before passage through the rectangular markers of a magnetic tape, not shown. As in FIG. 7, light passing through the tape is then converged on the horizontal axis onto the detector by a cylindrical lens 186 mounted in a forward wall 180 of a cartridge. A particular advantage in using cylindrical lenses as shown in FIGS. 7 and 8 is that the optical element may be fabricated in a long extruded rod, and sliced to the required length on the horizontal axis. After slicing, the sliced ends may be hot embossed with a non-reflective texture. Other combinations of spherical and cylindrical lenses and methods of fabricating and mounting for the purposes of the invention will be obvious to those skilled in the art.

While the invention has been described for use with magnetic tape, it will be realized that the invention is applicable to control of other webs having similar construction.

We claim:

1. A method of marking position-indicating marks on a length of magnetic tape having a generally transparent tape substrate and having at least one light-absorptive coating made of magnetic material on a surface of said tape substrate, the method comprising the steps of,
    (a) directing a first laser beam having a selected energy onto a length of magnetic tape, the magnetic tape having a magnetic, light-absorptive coating on a surface of a generally transparent tape substrate,
    (b) providing continuous movement to said length of magnetic tape in a longitudinal direction by winding the length of magnetic tape from a supply roll to a take-up roll,
    (c) scanning said continuously moving length of magnetic tape with said first laser beam in a raster like manner, and
    (d) modulating said selected energy of said first laser beam, during said scanning, between a first energy level sufficient to ablate said magnetic, light-absorptive coating yet leave said tape substrate substantially intact, and a second energy level below a minimum energy level required to ablate said magnetic, light-absorptive coating, thereby forming generally transmissive rectangular marks at selected positions in the length of the magnetic tape.

2. The method of claim 1 wherein said step of modulating further comprises modulating the energy level of said first laser beam between said first and second energy level in a manner such that said rectangular marks are formed with a longitudinal extent substantially equal to the diameter of the ANSI Standard marker pattern for the end of tape and the beginning of tape, the marks further having a transverse extent greater than the longitudinal extent.

3. The method of claim 2 wherein said transverse extent is in the range of 0.047 inches and 0.125 inches.

4. The method of claim 1 further comprising the step of directing a second laser beam onto the magnetic tape, the second laser beam having an energy level which is modulated and scanned in a manner so as to ablate the magnetic, light-absorptive coating in the form of rectangular marks on the magnetic tape.

5. The method of claim 1 wherein said step of modulating further comprises modulating the energy level of the first laser beam to simultaneously ablate the magnetic light-absorptive coating and a light-absorptive coating on a surface of said tape substrate opposite said magnetic, light-absorptive coating.

6. A method of marking position-indicating marks on a length of magnetic tape having a generally transparent tape substrate and having at least one light-absorptive coating made of magnetic material on a surface of said tape substrate, the method comprising the steps of,
    (a) directing a first laser beam having a selected energy onto a length of magnetic tape in a first optical path and directing a second laser beam having a selected energy onto the length of magnetic tape in a second optical path, the magnetic tape having a magnetic, light-absorptive coating on a surface of a generally transparent tape substrate,
    (b) providing continuous movement to said length of magnetic tape in a longitudinal direction by winding the length of magnetic tape from a supply roll to a take-up roll,
    (c) scanning said continuously moving length of magnetic tape with said first and second laser beams in a raster like manner, and
    (d) modulating said selected energy of said first and second laser beams, during said scanning, between a first energy level sufficient to ablate said magnetic, light-absorptive coating yet leave said tape substrate substantially intact, and a second energy level below a minimum energy level required to ablate said magnetic, light-absorptive coating, the energy of the first and second laser beams being modulated between the first and second energy levels in a manner such that the marks have a longitudinal extent substantially equal to the diameter of the ANSI Standard marker pattern for the end of magnetic tape and the beginning of magnetic tape, the marks further having a transverse extent greater than the longitudinal extent, thereby forming generally transmissive rectangular marks in the length of the magnetic tape at selected positions.

7. The method of claim 6 wherein said transverse extent is in the range of 0.047 inches and 0.125 inches.

8. The method of claim 6 wherein said step of modulating further comprises modulating the energy levels of the first and second laser beams to simultaneously ablate the magnetic, light-absorptive coating and a non-magnetic, light-absorptive coating disposed on the opposite surface of the transparent tape substrate.

9. A method of marking position-indicating marks on a length of magnetic tape having a generally transparent tape substrate and having at least one light-absorptive coating made of magnetic material on a surface of said tape substrate and having another light-absorptive coating disposed on the opposite surface of the tape substrate, the method comprising the steps of:
   (a) directing a first laser beam having a selected energy onto a length of magnetic tape, the magnetic tape having a magnetic, light-absorptive coating on a surface of a generally transparent tape substrate and having a non-magnetic, light-absorptive coating disposed on a surface of the tape substrate opposite the magnetic coating,
   (b) providing continuous movement to said length of magnetic tape in a longitudinal direction by winding the length of magnetic tape from a supply roll to a take-up roll,
   (c) scanning said continuously moving length of magnetic tape with said first laser beam in a raster like manner,
   (d) modulating said selected energy of said first laser beam, during said scanning, between a first energy level sufficient to simultaneously ablate said magnetic, light-absorptive coating and said non-magnetic, light-absorptive coating yet leave said tape substrate substantially intact, and a second energy level below a minimum energy level required to ablate said magnetic, light-absorptive coating, the energy of the first laser beam being modulated between the first and second energy levels in a manner such that the marks have a longitudinal extent substantially equal to the diameter of the ANSI Standard marker pattern for the end of magnetic tape and the beginning of magnetic tape, the marks further having a transverse extent greater than the longitudinal extent, thereby forming generally transmissive rectangular marks in the length of the magnetic tape at selected positions.

10. The method of claim 9 wherein said step of modulating further comprises modulating the energy level of said first laser beam between said first and second energy levels in a manner such that said rectangular marks are formed with a longitudinal extent substantially equal to the diameter of the ANSI Standard marker pattern for the end of magnetic tape and the beginning of magnetic tape, the marks further having a transverse extent greater than the longitudinal extent.

11. The method of claim 9 wherein said step of modulating further comprises modulating the energy level of the first laser beam to simultaneously ablate the magnetic light-absorptive coating and a light-absorptive coating on a surface of said tape substrate opposite said magnetic, light-absorptive coating.

12. A method of marking position-indicating marks on a length of magnetic tape having a generally transparent tape substrate and having at least one light-absorptive coating made of magnetic material on a surface of said tape substrate, the method comprising the steps of:
   (a) directing a first laser beam having a selected energy onto a length of magnetic tape, the magnetic tape having a magnetic, light-absorptive coating on a surface of a generally transparent tape substrate,
   (b) providing continuous movement to said length of magnetic tape in a longitudinal direction by winding the length of magnetic tape from a supply roll to a take-up roll,
   (c) scanning said continuously moving length of magnetic tape with said first laser beam in a raster like manner,
   (d) modulating said selected energy of said first laser beam, during said scanning, between a first energy level sufficient to ablate said magnetic, light-absorptive coating and to alter said transmissive substrate to scatter a read beam, and a second energy level below a minimum energy level required to ablate the magnetic, light-absorptive coating, thereby forming generally diffuse rectangular marks at selected positions in the length of the magnetic tape.

13. The method of claim 12 wherein said step of modulating further comprises modulating the energy level of said first laser beam between said first and second energy levels in a manner such that said rectangular marks are formed with a longitudinal extent substantially equal to the diameter of the ANSI Standard marker pattern for the end of magnetic tape and the beginning of magnetic tape, the marks further having a transverse extent greater than the longitudinal extent.

* * * * *